(12) United States Patent
Mittal et al.

(10) Patent No.: US 9,031,876 B2
(45) Date of Patent: May 12, 2015

(54) MANAGING KEYS FOR ENCRYPTED SHARED DOCUMENTS

(75) Inventors: Hemant Mittal, Morgan Hill, CA (US); Syama Sundararao Nadiminti, Bangalore Karnataka (IN); Sue Pei Wang, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1392 days.

(21) Appl. No.: 12/488,068

(22) Filed: Jun. 19, 2009

(65) Prior Publication Data
US 2010/0325732 A1 Dec. 23, 2010

(51) Int. Cl.
G06Q 99/00 (2006.01)
H04L 9/08 (2006.01)
G06F 21/60 (2013.01)
H04L 29/06 (2006.01)

(52) U.S. Cl.
CPC .......... *H04L 9/0822* (2013.01); *G06Q 2220/10* (2013.01); *G06Q 2220/12* (2013.01); *G06F 21/604* (2013.01); *H04L 9/0825* (2013.01); *H04L 9/0833* (2013.01); *H04L 63/065* (2013.01)

(58) Field of Classification Search
CPC ... H04L 9/0822; H04L 9/0825; H04L 9/0833; G06F 21/604; G06Q 2220/10; G06Q 2220/12
USPC ....................... 705/50–51; 726/26
See application file for complete search history.

(56) References Cited

U.S. PATENT DOCUMENTS

| 5,787,175 A | 7/1998 | Carter |
| 6,151,676 A * | 11/2000 | Cuccia et al. ................. 713/176 |
| 6,154,840 A | 11/2000 | Pebley et al. |
| 6,192,130 B1 * | 2/2001 | Otway .......................... 380/277 |
| 6,229,894 B1 * | 5/2001 | Van Oorschot et al. ...... 713/150 |
| 6,289,450 B1 | 9/2001 | Pensak et al. |
| 6,370,250 B1 * | 4/2002 | Stein ............................ 380/281 |
| 6,424,718 B1 * | 7/2002 | Holloway ..................... 380/277 |
| 6,711,263 B1 * | 3/2004 | Nordenstam et al. ......... 380/282 |
| 6,738,907 B1 * | 5/2004 | Carter ................................ 726/9 |
| 6,915,434 B1 | 7/2005 | Kuroda et al. |
| 6,978,367 B1 * | 12/2005 | Hind et al. .................... 713/167 |
| 7,142,883 B2 | 11/2006 | Rouse et al. |
| 7,260,555 B2 * | 8/2007 | Rossmann et al. .............. 705/51 |
| 7,272,610 B2 * | 9/2007 | Torres ................................... 1/1 |
| 7,860,243 B2 * | 12/2010 | Zheng et al. .................... 380/30 |
| 2005/0021875 A1 | 1/2005 | Bouthemy et al. |
| 2005/0039034 A1 * | 2/2005 | Doyle et al. .................. 713/193 |
| 2005/0084108 A1 * | 4/2005 | Durand et al. ................ 380/259 |
| 2005/0154885 A1 * | 7/2005 | Viscomi et al. ............... 713/165 |
| 2009/0307759 A1 * | 12/2009 | Schnell et al. .................... 726/4 |

OTHER PUBLICATIONS

Lynch, Jaqui, "Locking Down Files With Encrypted File System", IBM Systems Magazine, Sep. 2008, Published on webiste by MSP Commucations 2009.
John, Anto A., "Understanding EFS: A simple hand book for beginners", IBM, Jan. 29, 2008.

* cited by examiner

*Primary Examiner* — James D Nigh
(74) *Attorney, Agent, or Firm* — Clifton L. Anderson (57) ABSTRACT

A system administrator, while logged into a system-administrator account, creates and configures a key-administrator account and a member account. A key administrator, while logged into said key-administrator account, creates a group private key, a group public key, and a group symmetric key, a member private key, and a member public key. The key administrator encrypts the group private key with the group symmetric key, and encrypts said group symmetric key with the member public key. A publisher encrypts a document using the group public key. The publisher distributes the resulting encrypted group document so that it is accessible via said member account but not through said key-administrator account.

5 Claims, 8 Drawing Sheets

FIG. 1

USER PUBLISHER 201
ACCOUNT LOG-IN
CAN ACCESS GROUP PUBLIC KEY
ENCRYPTS GROUP DOCUMENT USING GROUP PUBLIC KEY
DISTRIBUTES GROUP DOCUMENT TO GROUP MEMBERS

GROUP MEMBERS USERS 203
ACCOUNT LOG-IN
USES OWN KEY PASSWORD TO ACCESS OWN PRIVATE KEY
USES OWN PRIVATE KEY TO ACCESS GROUP PRIVATE KEY
USES GROUP PRIVATE KEY TO DECRYPT GROUP DOCUMENT
*CLEAR ACCESS TO GROUP DOCUMENTS*

NON-GROUP MEMBER USERS 205
ACCOUNT LOG-IN
DOES NOT (GENERALLY) HAVE ACCESS TO GROUP DOCUMENT
CANNOT NOT ACCESS GROUP PRIVATE KEY
CANNOT DECRYPT GROUP DOCUMENT
*NO CLEAR ACCESS TO GROUP DOCUMENTS*

KEY ADMINISTRATOR 207
KEY-ADMINISTRATOR ACCOUNT-LOG-IN
ACCESS TO SYSTEM LIMITED BY KEY-MANAGER PROGRAM
CREATES VAULTS & KEYS FOR USERS & GROUPS & SELF
CREATES GROUP PUBLIC, PRIVATE & SYMMETRIC KEYS
ENCRYPTS GROUP PRIVATE KEY WITH GROUP SYMMETRIC KEY
STORES ENCRYPTED GROUP PRIVATE KEY IN GROUP VAULT
STORES GROUP PUBLIC KEY IN GROUP VAULT
CAN RESET KEYS & KEY PASSWORDS
CAN MOVE GROUP PRIVATE KEY
CANNOT USE GROUP PRIVATE KEY
CANNOT ACCESS GROUP DOCUMENT
CANNOT DECRYPT GROUP DOCUMENT
*NO CLEAR ACCESS TO GROUP DOCUMENTS*

SYSTEM ADMINISTRATOR 209
SYSTEM-ADMINISTRATOR ACCOUNT LOG-IN
CREATES USER & KEY-MANAGER ACCOUNTS
CONTROLS ACCOUNT PASSWORDS
DOES NOT CONTROL KEY PASSWORDS
HAS ROOT DIRECTORY ACCESS TO GROUP DOCUMENTS
CANNOT DECRYPT GROUP PRIVATE KEYS
CANNOT DECRYPT GROUP DOCUMENTS
*NO CLEAR ACCESS TO GROUP DOCUMENTS*

MANAGING KEYS FOR ENCRYPTED SHARED DOCUMENTS

BACKGROUND

Herein, related art is described for expository purposes. Related art labeled "prior art", if any, is admitted prior art; related art not labeled "prior art" is not admitted prior art.

While not quite an oxymoron, "secure sharing" of electronic documents among members of a group over a network to which non-members have access is a challenge. Of course, a document to be shared can be encrypted, but if the key required for decryption must be distributed to group members, there may be too many opportunities for the key to end up in the wrong hands.

When sending a document to an individual, the document can be encrypted with that individual's public key; decryption involves using a private key already in the individual's possession. This approach does not scale very well to large groups as each member of the group must receive a different encrypted version of each document to be shared. In a variation of this approach, the document is encrypted using a symmetric key; the symmetric key is encrypted with the individual's public key and included in the document header. In this case, only one version of the document is involved, but multiple encrypted versions of the document-encryption key are included in the document header.

A more scaleable and manageable approach is to use a group public key to encrypt a group document or its encryption key and encrypt the corresponding group private key using respective member public keys; in this case, only one version of the encrypted document with at most a single version of a symmetric encryption key in the header is involved. Different member private keys are used by the different members to decrypt the document or its symmetric encryption key; however, since the private key does not change on a document-by-document basis, a change in membership of a group does not require any change in the document header; also, the different private keys do not have to be distributed every time a new document is shared.

BRIEF DESCRIPTION OF THE DRAWINGS

In FIG. 3, combination-lock icons represent containers requiring authentication, e.g., a password or fingerprint recognition, for entry, while padlocks represent item requiring an encryption key for decryption.

DETAILED DESCRIPTION

Consider the question of who should manage keys by providing for a key-administrator, distinct from a system administrator, to manage group and member keys. Having the publisher generate and manage the group private key runs into scalability problems if different members are to publish. Also, generation and management of encryption keys may not be within the respective skill sets of all members that might want to publish.

Having a system administrator handle the generation and management of encryption keys addresses scalability and skills set issues, but provides clear access to encrypted documents to a non-member (in the general case in which the system administrator is not a member of the group). For example, the system administrator's manager might want to exchange documents with a human-resources department regarding the system-administrator's performance; obviously, the system-administrator should not have clear access to the documents involved. Furthermore, unauthorized access to the system administrator account could provide clear access to all encrypted documents for all groups.

Assigning key generation and key management responsibilities to a key administrator excludes the system administrator (and any accessing the system-administrator account) from clear access to private keys—and thus from decrypting group documents (for groups to which the system administrator does not belong). In the meantime, the key administrator can be precluded from accessing the encrypted group documents (for groups to which the key administrator does not belong) and thus from clear access to the encrypted documents. Thus, no single non-member account provides clear access to encrypted group documents. This approach is scalable, secure and easy to manage for sharing encrypted files among group members.

Figure 1:
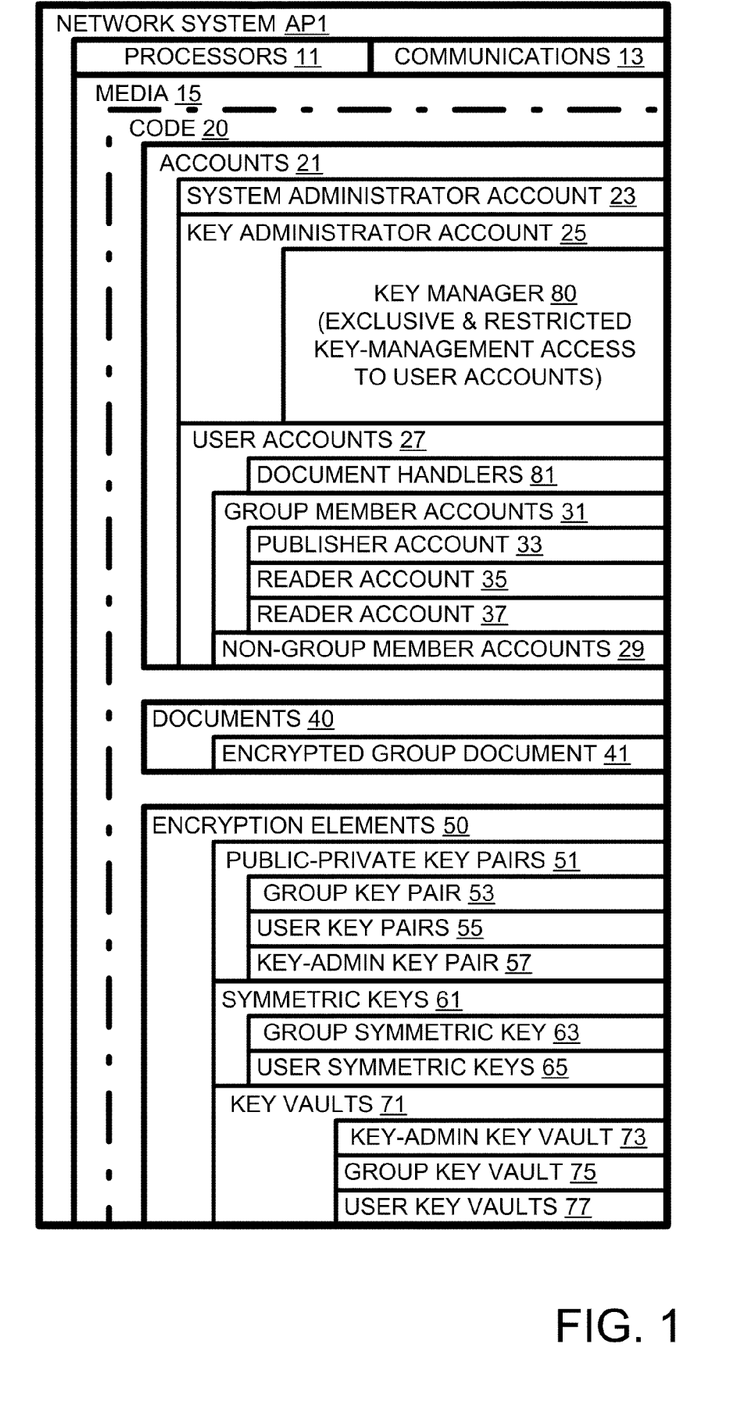
FIG. 1 is a schematic diagram of a computer system.

A network system AP1 is shown in FIG. 1 including processors 11, communications devices 13, and computer-readable storage media 15. Processors 11, which can be distributed among network nodes, provide for executing tangible computer-executable instructions that can call for, for example, reading, modifying, and writing data. Communications devices 13 can include network infrastructure cabling and devices, network interfaces such as network interface cards and host-bus adapter, as well as I/O devices such as keyboards, mice, and displays.

Media 15, which can include solid-state memory and disk-based storage, for example, is tangibly encoded with code 20. Code 20 defines data and computer-executable instructions. The data can define data structures that can contain other data. For example, code 20 defines various accounts 21 for accessing all or portions of computer system AP1. Accounts 21 can include a system-administrator account 23, a key-administrator account 25, and user accounts 27.

User accounts 27 can include non group-member accounts 29 and group-member accounts 31. The classification of a user account 27 as a group-member account 29 or a non-group member account 31 can vary from group to group and within a group over time. As shown in FIG. 1, group member accounts 31 include a publisher account 33 and reader accounts 35 and 37. The classification of member accounts into publisher accounts and reader accounts can vary from document to document and from revision to revision.

Code 20 defines documents 40, including an encrypted group document 41. Code 20 also defines: encryption elements, including public-private key pairs 51, e.g., a group key pair 53, user key pairs 55, and a key-administrator key pair 57; symmetric keys 61, including a group symmetric key 63 and user symmetric keys 65; and key vaults 71, including a key-administrator key vault 73, a group key vault 75, and user key vaults 77.

For expository purposes, the focus is on a single group. However, system AP1 supports multiple groups with memberships that differ among groups and over time. Each group can have its own public, private, and symmetric keys that may or may not change over time. The public and private user keys can be used for all groups for which the owner-user is a member; the key-administrator can add or remove group symmetric keys that have been encrypted using a user's public key as that user enters or leaves groups.

Code 20 includes instructions that define a key manager program 80 and document handlers 81. Key manager 80 is restricted, e.g., by authentication procedures, to the key administrator. Key manager 80 allows the key administrator to create and manage encryption elements 50, but restricts access to system AP1 so that the key administrator cannot access group documents (for groups of which the key administrator is not a member). Document handlers 81 automate encryption and decryption for group members.

Figure 2:
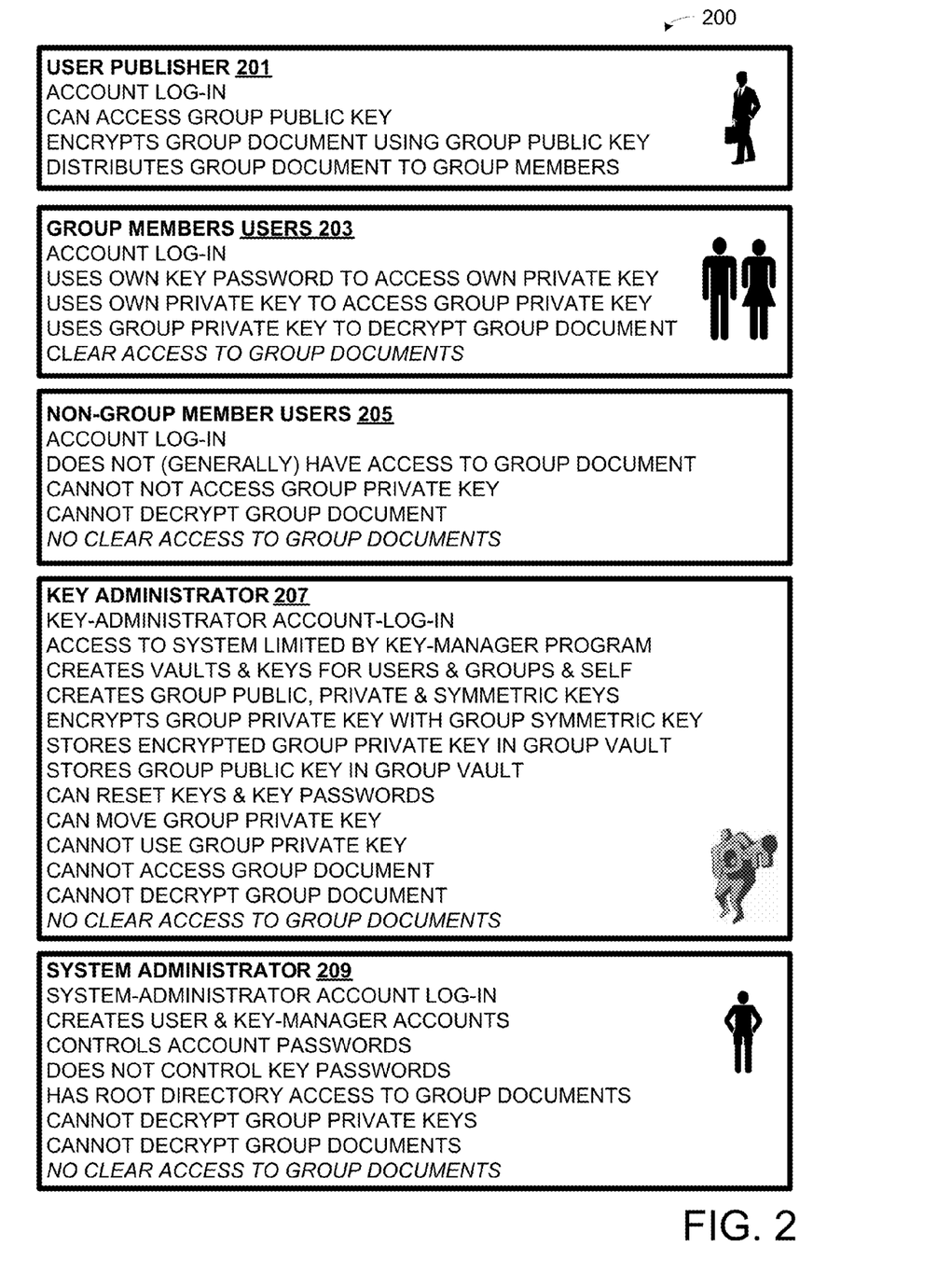
FIG. 2 is a table of human users and administrators of the system of FIG. 1.

To understand the functional relationships among its elements, it may be helpful to examine the roles 200 and responsibilities of the humans that interact with system AP1, as shown in FIG. 2. A publisher 201 is a person (or department, company, etc.) having a responsibility to securely share a document with a group. In cooperative-authorship scenarios contemplated herein, the publisher can be a member of the target group and a user on this system to which the group belongs. In other scenarios, the publisher can be a non-member or a non-user or both. The publisher uses a group public key to encrypt a group document and distributes copies of the encrypted group document to group members. The distributing can involve, for example, emailing the document as an attachment or posting the document on a website to which the members have access.

While group members that are not users of system AP1 can be accommodated, herein, all group members 203 are users of system AP1 and have associated accounts that control access to documents in directories associated with those accounts. Generally, each user has qualified exclusive access to the associated account through an authentication procedure; a system administrator and possibly a few others may have access to documents associated with a user account via another account with root or intermediate-level directory access. A user-member can use a member private key to decrypt a group symmetric key (encrypted using the member public key) to decrypt a group private key to decrypt a group document encrypted using the group public key.

In general, system AP1 will have users that are not members of a given group. System AP1 is set up so that these non-members users 205 cannot get clear access to a group document for two reasons. In the first place, non-members will not, in general, have access to encrypted group documents. In any event, non-members will not have access to the clear group private key required to decrypt the document. There will be no copy of the group symmetric key encrypted using a non-member's public key. Thus, the non-member will not be able to use the non-member's private key to decrypt any copy of the group symmetric key, which is needed to access the group private key, which is needed to decrypt the group document.

Key administrator 207 generally manages encryption keys. This managing can involve creating, deleting, encrypting, and distributing keys to provide the encryption system discussed below with reference to FIG. 3. These activities are performed by logging into the key-administrator account and using a key manager program. The key manager program provides limited access to user accounts for the purpose of managing keys, but prohibits the key administrator from accessing documents associated with those accounts. While the key administrator is responsible for ensuring that clear copies of (user and group) private and symmetric keys are not maintained, the key administrator may have access to clear versions of all keys when creating the encrypted versions. However, even with clear access to private keys, the key administrator could not get clear access to group documents since the encrypted versions are not accessible to the key administrator.

System administrator 209 creates and manages the user and key-administrator accounts. System administrator 209 has root directory access to system AP1 and, thus, access to all user and group documents and keys. However, while the system administrator may be able to access encrypted version of keys, the system administrator cannot obtain clear version of keys needed for decrypting encrypted group documents.

Figure 3:
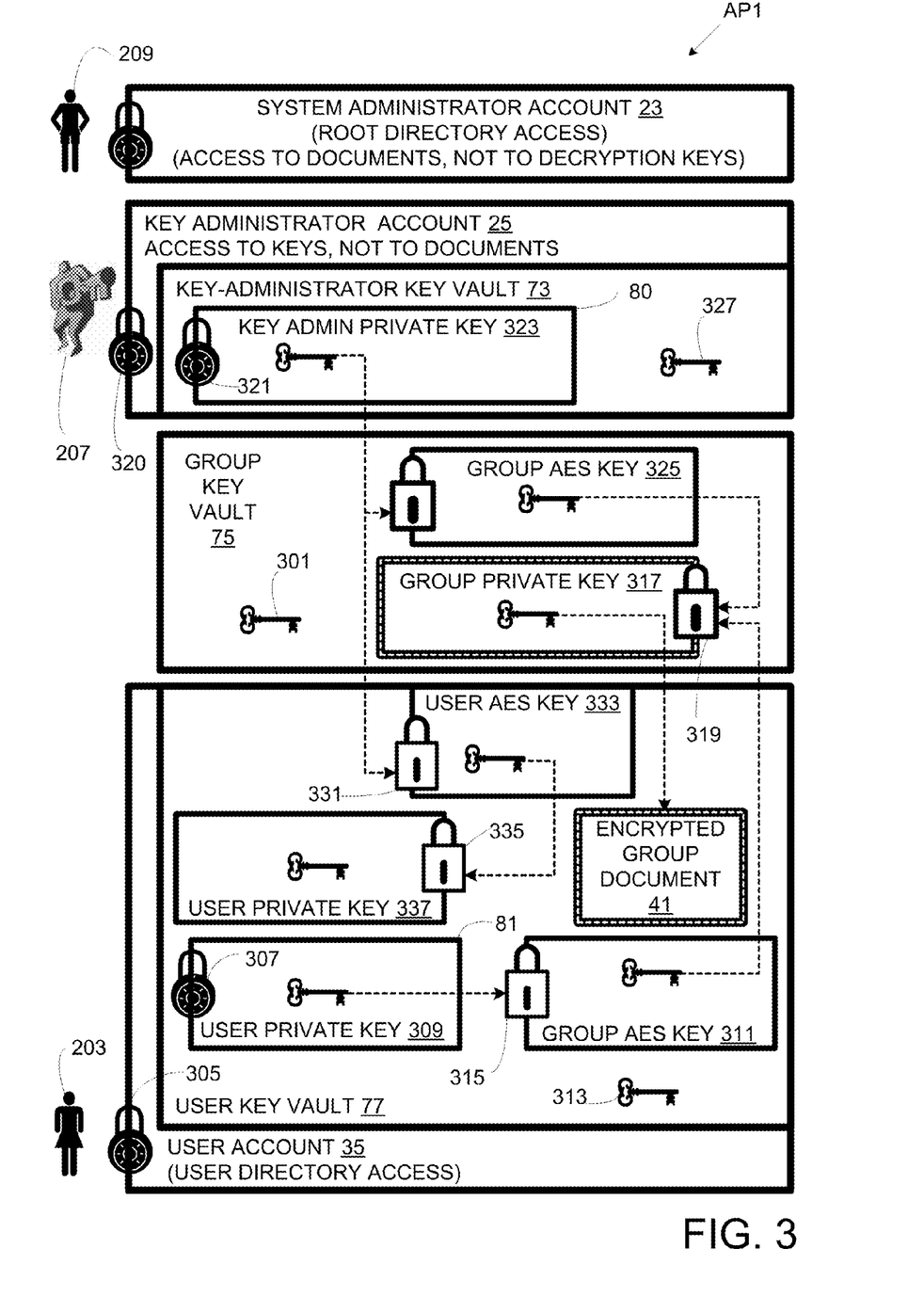
FIG. 3 is a schematic diagram of the system of FIG. 1 showing a distribution of keys among accounts and key vaults of the system of FIG. 1.

System administrator 209 accesses system administrator account 23 to create key administrator account 25 and user accounts 27, FIG. 1. Key administrator 207 (FIG. 2) creates and configures encryption elements 50 (FIG. 1) for system AP1 using key administrator account 23 and key manager 80, resulting in the configuration of system AP1 shown in FIG. 3. FIG. 3 represents a state in which accounts and encryption elements have been created and configured; in addition, a group document 41 has been encrypted and distributed.

For user-reader 203 to read its contents, encrypted group document 41 must be decrypted. Group document 41 has been encrypted using a group public key 301 (FIG. 3), so a corresponding clear version of group private key 302 is required to decrypt document 41. Keys 301 and 303 are the individual keys of pair 53 (FIG. 1). To this end, reader 203 must log into user account 35, which involves authentication as indicated at lock 305. Authentication locks sometimes must be reset. In this case, system administrator 209 can reset the log-in password (or other authentication token) for user account 35.

Once logged in, user 203 is authenticated by lock 307, which is presented by an associated document handler 81 when activated by user 203. This permits user 203 via document handler 81 to access user private key 309 in the clear. Resetting the password for lock 307 requires replacement of user private key 309 by key administrator 207. System administrator 209 cannot access member private keys through document handlers 81.

Document handler 81 uses now-clear user private key 309 to decrypt group AES (American Encryption Standard) symmetric key 311, which was encrypted using user public key 313. This encryption is represented by lock 315. Keys 309 and 313 constitute one of user key pairs 55 (FIG. 1).

The now-clear group symmetric key 311 is used to decrypt group private key 317, which was encrypted using key 311. This encryption is indicated by lock 319. The now-clear group private key 317 is then used to decrypt group document 41 for reading by user 35. In the foregoing, document handler 81 maintains all clear documents and keys in volatile system memory and does not store them in clear form where someone with file access can read them.

Key administrator 207 can reset a group private key as follows. Authentication at lock 320 permits the log-in to key administrator account 25. Authentication at lock 321 provides clear access to key administrator private key 323. Key manager 80 can use the now clear private key to decrypt a copy 325 (identical to copy 311, but wrapped with a different public key) of group AES symmetric key, which had been encrypted using key-administrator public key 327. Keys 323 and 327 constitute key-administrator key pair 57 of FIG. 1.

The now clear symmetric copy can be used to provide access through lock 319 to group private key 317, which can then be removed and replaced by a new group private key.

Key administrator 207 can reset a user private key, such as key 309, as follows. As above, authentication at lock 320 permits the log-in to key administration account 25. Authentication at lock 321, administered by key manager program 80, provides access to key-administrator private key 323. This, in turn, provides access at lock 329 to user AES symmetric key 331, which had been encrypted using user public key 313. The decrypted user AES symmetric key 333 provides access at lock 335 to a copy 337 of the user private key. Key administrator 207 replaces this private key. In addition, key administrator 207 replaces user private key 309 as locked at 307. A new authentication password or other token will be required when user 35 next launches document handler 81.

A recovery agent (not shown) can be used to set the key administrator's password. The recovery agent is like a regular user account except that the private key associated with this account is kept in a physical vault. The recovery agent private key is brought in to reset the key-administrator passphrase. The key-administrator key vault contains a key-administrator AES Key wrapped with the recovery agent's public key.

Figure 4:
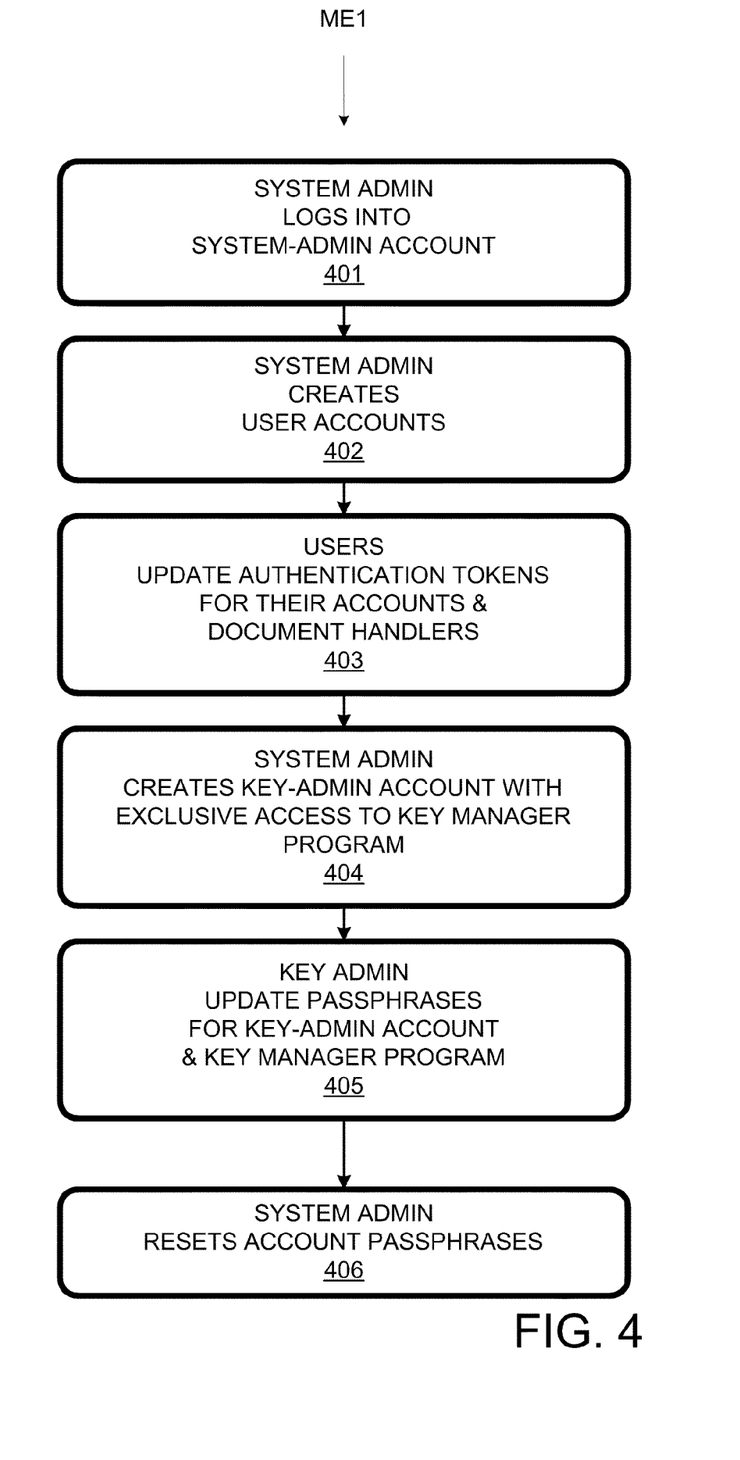
FIG. 4 is a flow chart representing an "account setup" portion of a method implemented in accordance with a method practiced in the context of the system of FIG. 1.

System AP1 provides for a method ME, various aspects of which are flow charted in the following figures. As shown in FIG. 4, at method segment 401, a system administrator logs into a system administrator account. At method segment 402, the system administrator creates user accounts, but they do not have to all be created in one session. Creation of user accounts involves configuring them with document handlers 81. Method segment 403 involves users logging into their respective accounts and setting or resetting their log-in passphrases and authentication tokens for accessing document handlers.

At method segment 404, the system administrator creates a key-administrator account with exclusive access to a key-manager program. At method segment 405, the key administrator sets or resets authentication tokens for account log-in and access to the key manager program. Steps 404 and 405 can come before, after, and between user account creations at method segment 402.

When an account passphrase must be reset, the system administrator performs the reset at method segment 406. The user can then update at method segment 403. The reset can be because a user forgot a passphrase or because the person associated with the account has changed.

Figure 5:
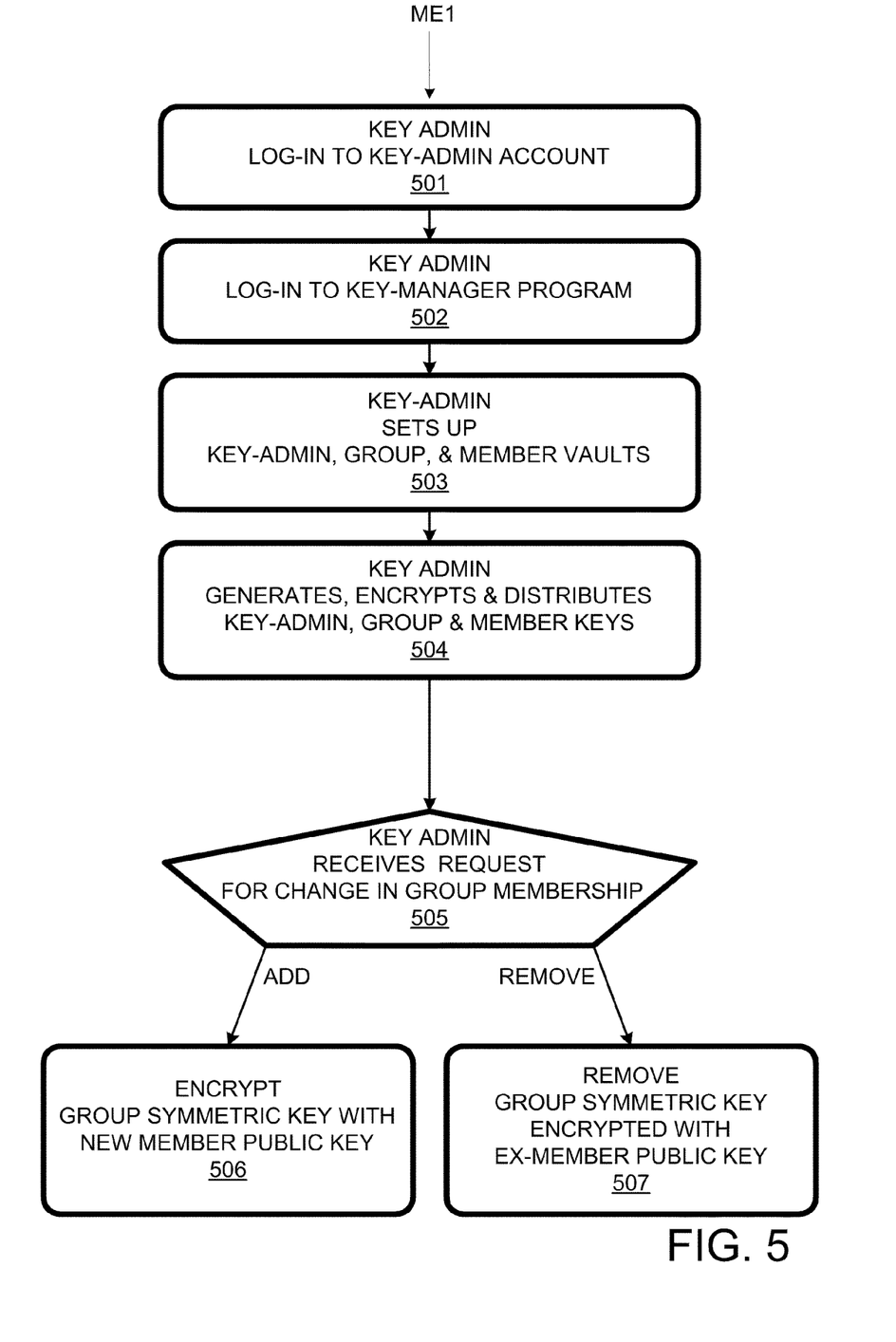
FIG. 5 is a flow chart representing a "key-administration" portion of the method of FIG. 4.

At method segment 501, FIG. 5, the key administrator logs into the key administrator account by presenting the appropriate authentication. At method segment 502, the key administrator logs into the key manager program using another appropriate authentication passphrase. At method segment 503, the key administrator sets up key-administrator, group, and member key vaults. At methods segment 504, the key administrator generates, encrypts, and distributes to vaults key-administrator, group, and member keys, including public, private, and symmetric keys.

At method segment 505, the key administrator receives a request for a change in group membership. If the request involves adding a member, the key administrator encrypts a group symmetric key with a new member public key at method segment 506. If the request involves removing a group member, the key administrator accesses and removes a group symmetric key encrypted with the ex-members public key at method segment 507.

Figure 6:
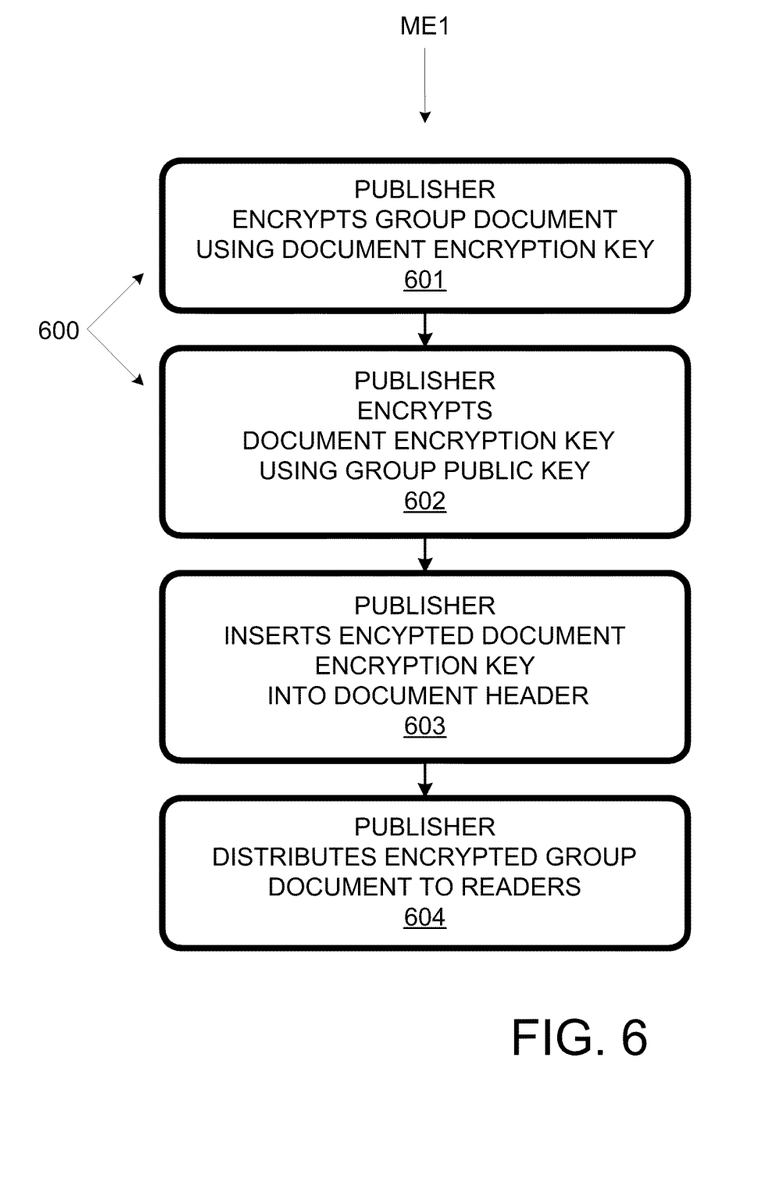
FIG. 6 is a flow chart representing a "publishing" portion of the method of FIG. 4.

At method segment 601, FIG. 6, a publisher encrypts a group document using a group public key. This can involve a publisher encrypting a group document using a document encryption key at method segment 601, the publishing encrypting the document encryption key with the group private key at method segment 602, and the publisher inserting the encrypted document encryption key into the document header at method segment 603. At method segment 604, the publisher distributes the encrypted group document to readers. Distribution can involve sending the document directly or posting it where readers can access it.

Figure 7:
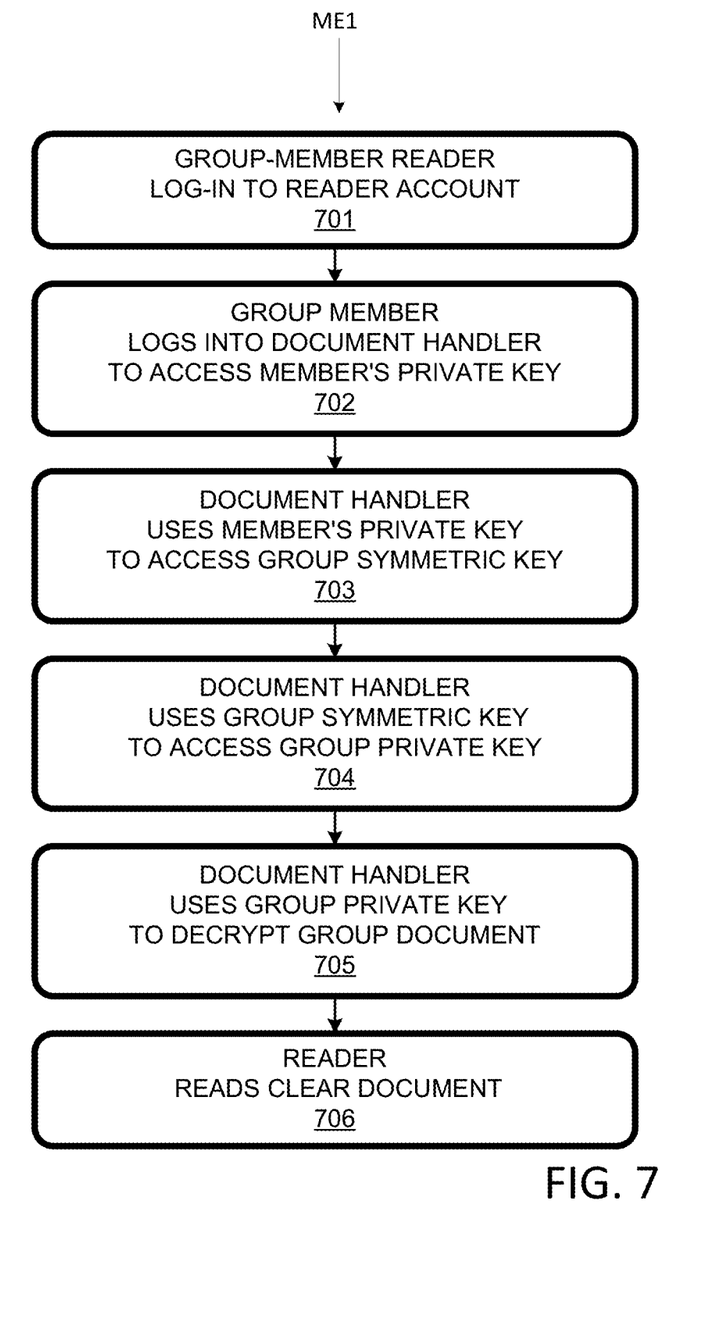
FIG. 7 is a flow chart representing a "decryption" portion of the method of FIG. 4.

At method segment 701, FIG. 7, a group member reader logs into the group member's account. At method segment 702, the group member logs into a document-handling program; upon authentication, this provides clear access to the member's private key. The document handler uses the member's private key to access/decrypt the group AES symmetric key at method segment 703. The document handler uses the group symmetric key to access/decrypt the group private key at method segment 704. The document handler using the group private key to decrypt the group document and present it to the member at method segment 705. The reader reads the clear document at method segment 706.

Figure 8:
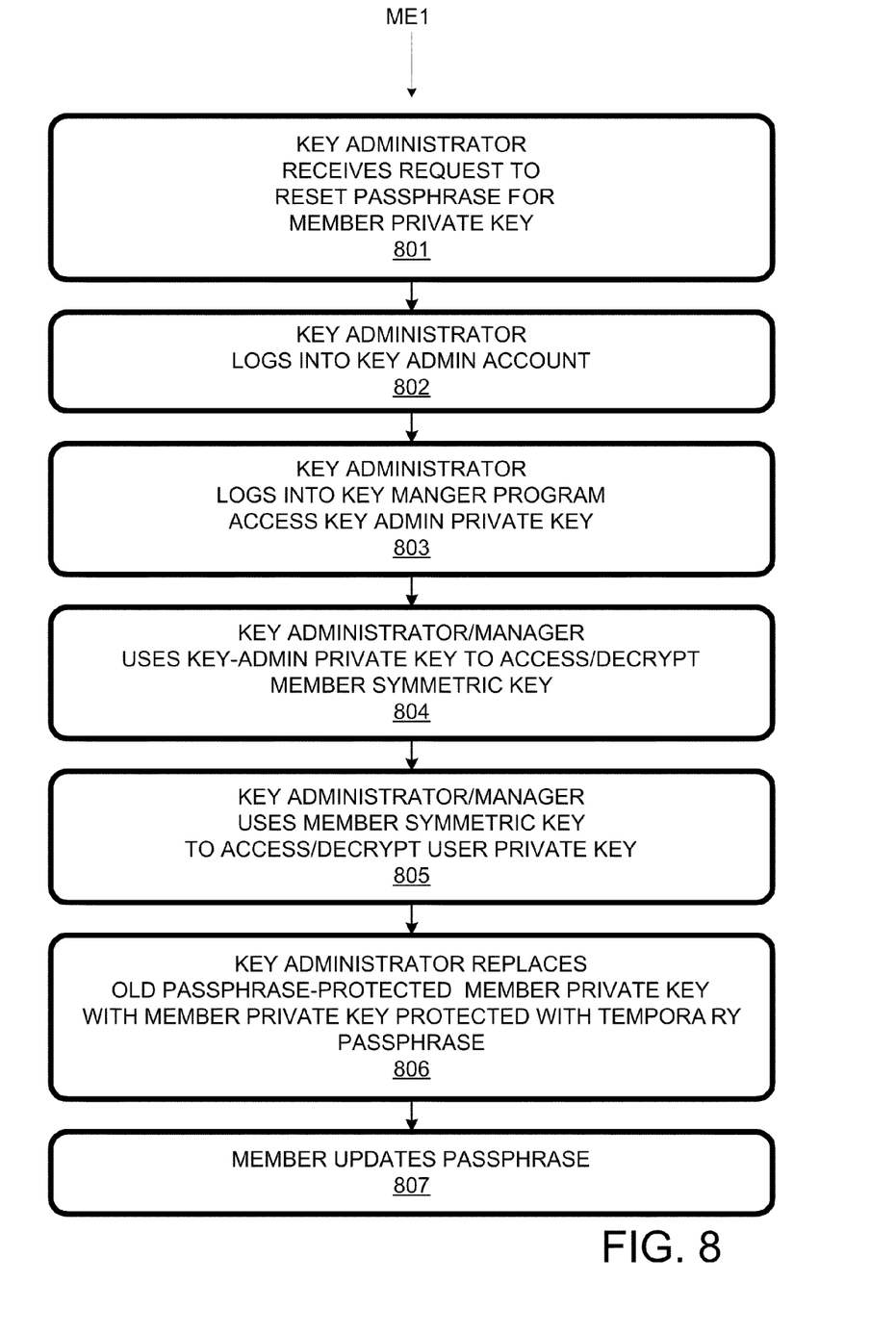
FIG. 8 is a flow chart representing a "passphrase reset" portion of the method of FIG. 4.

At method segment 801, a key administrator receives a request to reset a passphrase/authenticator for a member private key. At method segment 802, the key administrator, if not already logged in, logs into the key-administrator account. At method segment 803, the key administrator logs into the key-manager program, thereby accessing the key administrator private key. At method segment 804, the key administrator uses the key-manager program to access/decrypt a member symmetric key. At method segment 805, the key administrator uses the member symmetric key to access/decrypt the user private key. At method segment 806 the key administrator replaces the passphrase-protected private key with a temporary (in that the member will reset the passphrase at the next authentication) passphrase-protected member private key. At method segment 807, the member sets authentication for the new passphrase-protected member private key. Note, instead of passphrases, other forms of authentication tokens can be used.

The key administrator is responsible for managing of group keys. The following operations can be performed by key administrator for managing the group keys. The key administrator can create group by performing the following steps.

1. Key administrator keys-in its passphrase and name of the group (say "Project")
2. System uses the passphrase to retrieve the private key of the key administrator.
3. System generates the RSA public-private key pair for the group Project.
4. System constructs a key vault and generates the AES key for the key vault for the group project.
5. System adds the private key of the group Project to the key vault.
6. System uses the AES key to lock the key vault.
7. System wraps the AES key with the key administrator's public key and stores inside the group vault as the key-administrator's vault lock.
8. System stores the public key of the group Project inside the group vault.

The following sequences of steps are followed when a User generates keys for itself:

User (say Joe) keys-in a passphrase.
1. System generates the RSA public-private key pair for the user Joe.
2. System constructs a key vault and generates the AES key for the key vault for the user Joe.
3. System adds the user Joe's private key into the key vault.
4. System uses the AES key to lock the key vault.

5. System wraps the AES key with the user Joe's public key and stores inside the user vault as the user vault lock.
6. System wraps the AES key with the key administrator's public key and stores inside the user vault as the key administrator's vault lock.
7. System stores the public key of the user Joe inside the user vault.
8. System stores the private key of user Joe wrapped with the passphrase inside the user vault.

The following sequences of steps are followed when key administrator adds a new user to a group:
1. Key administrator keys-in its passphrase, name of the group (say Project) and user (say Joe)
2. System uses the passphrase to retrieve the private key of the key administrator
3. System uses the key administrator's private key to open the group Project's key administrator vault lock
4. System retrieves the group Project's AES Key to the key vault.
5. System uses the key administrator's private key to open the user Joe's key administrator vault lock
6. System wraps the group Project's AES Key with the user Joe's public key and stores inside the user Joe's user vault.

The following sequences of steps are followed when the key administrator removes a user from the Group.
1. Key administrator keys-in its passphrase, name of the group (say Project) and user (say Joe)
2. System uses the passphrase to retrieve the private key of the Key administrator
3. System uses the Key administrator's private key to open the user Joe's key administrator vault lock.
4. System removes the group Project's AES key wrapped with the user Joe's public key from the user Joe's user vault.

The following sequences of steps are performed to delete a group.
1. Key administrator keys-in its passphrase, name of the group (say Project).
2. System uses the passphrase to retrieve the private key of the key administrator.
3. For each member in the group
   a. System uses the key administrator's private key to open the member's key administrator vault lock.
   b. System removes the group AES key which was wrapped with the member's public key from the member's user vault.
4. System removes the group Project's group key vault.

In a secure session, the private keys of the session owner and the primary's group keys to which the owner belongs to are loaded into memory. When a file is accessed using the primary group or secondary group permissions, system uses that particular group private key is available in the secure session. Otherwise it would contact the key administrator daemon "keymgrd" to load the corresponding group private key from user's key vault. The file cannot be accessed if the required key is not available. The following sequences of steps are for a user to load the primary group key into a secure session.
1. The user keys-in its passphrase, name of the group (say Project).
2. System uses the passphrase to retrieve the user's private key.
3. System uses the user's private key to unwrap its primary group's AES key
4. System uses the group's AES key to open the group's key vault.
5. System retrieves the group's private key.
6. System loads both group's private key and public key into the user session.

The following sequences of steps are for the Key administrator to reset another user's passphrase.
1. Key administrator keys-in its passphrase, name of the user.
2. System uses the passphrase to retrieve the private key of the key administrator.
3. System uses Key administrator's private to open the user's keyVault.
4. System retrieves the user's private key from the key vault.
5. System prompts for the user's new passphrase.
6. System encrypts the user's private key with the new passphrase and stores inside the user vault for the user.

Scenario when an encrypted file is created
1. Process issues open system call with the create flags from a secure session.
2. System generates a new file encryption key for encrypting data
3. System wraps the file encryption key using document owner's public key
4. System stores the owner keywrap in EMD blocks of file
5. System wraps the file encryption key using the document owner's primary group public key
6. System stores the group keywrap in EMD blocks of file Scenario when an encrypted file is opened for read/write with group permissions.

```
BEGIN
    IF the user who is accessing the file is not owner of the file
        Get the group information (GID)
        Search the keytable in secure session for the corresponding
        group's private key
        IF group private key available
            BREAK
        ELSE
            Contact keymgrd daemon to load the corresponding
            group's private key from user keyVault
            IF successful
                BREAK
            ELSE
                RETURN EACCESS
            ENDIF
        ENDIF
        Use the group's private key to unwrap the File Encryption
        Key.
        Use this File Encryption Key to access (read/write) the file in
        clear
    ENDIF
END
```

The foregoing procedures are just a few of many possible examples of how a system can provide different roles for a system administrator and a key administrator. These and other variations upon and modifications within the scope defined by the following claims.

What is claimed is:
1. A method comprising:
    creating and configuring accounts via a system-administrator account on a network system, said accounts including a key-administrator account and plural member accounts, said key-administrator account being separate from said system-administrator account, said creating and configuring including processing by processors of said network system;
    creating keys via said key-administrator account, said keys including a group private key, a group public key, a group symmetric key, member private keys correspond- ing to respective accounts, and member public keys corresponding to respective member accounts;

encrypting, via said key-administrator account, said group private key with said group symmetric key and said group symmetric key with said member public keys;

encrypting a document with said group public key to yield an encrypted group document; and distributing said encrypted group document to locations accessible via respective ones of said member accounts and via said system administrator account but not accessible through said key-administrator account.

2. A method as recited in claim 1 further comprising:

decrypting said group symmetric key with said member private keys via respective member accounts;

decrypting said group private key with said group symmetric key via respective member accounts, and decrypting said document with said group private key via respective member accounts.

3. A method as recited in claim 1 further comprising encrypting a copy of a member private key of said member private keys with a member symmetric key, and encrypting a copy of said member symmetric key with a key-administrator public key, said creating keys including creating said member symmetric key.

4. A method as recited in claim 3 further comprising:

accessing said member symmetric via said key-administrator account;

decrypting said member symmetric key with said key-administrator private key via said key-administrator account;

accessing said member private key via said key-administrator account;

decrypting said member private key with said member symmetric key via said key-administrator account;

wrapping said member private key in a temporary passphrase via said key-administrator account; and replacing a previous passphrase-protected member private key with said member private key wrapped in said temporary passphrase via said key-administrator account.

5. A method as recited in claim 4 further comprising resetting said temporary passphrase to a member passphrase via said member account.

\* \* \* \* \*

UNITED STATES PATENT AND TRADEMARK OFFICE
CERTIFICATE OF CORRECTION

| | | |
|---|---|---|
| PATENT NO. | : 9,031,876 B2 | Page 1 of 1 |
| APPLICATION NO. | : 12/488068 | |
| DATED | : May 12, 2015 | |
| INVENTOR(S) | : Hemant Mittal et al. | |

It is certified that error appears in the above-identified patent and that said Letters Patent is hereby corrected as shown below:

In the drawings

In sheet 2 of 8, reference numeral 205, line 4, delete "CANNOT NOT" and insert -- CANNOT --, therefor.

In sheet 6 of 8, reference numeral 603, line 2, delete "ENCYPTED" and insert -- ENCRYPTED --, therefor.

In the claims

In column 9, line 1, in Claim 1, delete "accounts" and insert -- member accounts --, therefor.

In column 10, line 5, in Claim 4, delete "via" and insert -- key via --, therefor.

Signed and Sealed this
Twenty-seventh Day of October, 2015

Michelle K. Lee
*Director of the United States Patent and Trademark Office*